No. 794,936. PATENTED JULY 18, 1905.
J. HARRIS.
HOPPER FOR SEED CLEANING MACHINES.
APPLICATION FILED JULY 21, 1904.

Witnesses
C. H. Olds.

Inventor
Jonathan Harris

No. 794,936. Patented July 18, 1905.

UNITED STATES PATENT OFFICE.

JONATHAN HARRIS, OF CLEVELAND, OHIO.

HOPPER FOR SEED-CLEANING MACHINES.

SPECIFICATION forming part of Letters Patent No. 794,936, dated July 18, 1905.

Application filed July 21, 1904. Serial No. 217,563.

*To all whom it may concern:*

Be it known that I, JONATHAN HARRIS, a citizen of the United States, and a resident of Cleveland, county of Cuyahoga, State of Ohio, have invented certain new and useful Improvements in Hoppers for Seed-Cleaning Machines, of which I hereby declare the following to be a full, clear, and exact description, such as will enable others skilled in the art to which it appertains to make and use the same.

The objects of the invention are twofold: first, to provide a simple and practical device for permitting the slide of the hopper of a seed-cleaning device to open and close uniformly at both ends, and, secondly, to provide an outlet-opening for seed or other material which might fall from the funnel upon the base-board or stop-board which closes the bottom of the funnel and which being attached to the upper end of the reciprocating shoe must move therewith and is liable to carry such material beyond and back of the funnel-wall and lodge it there, where it will be practically inaccessible for removal.

The invention consists in the combination and arrangement of parts and construction of details, as hereinafter described, shown in the accompanying drawings, and specifically pointed out in the claims.

Figure 1:
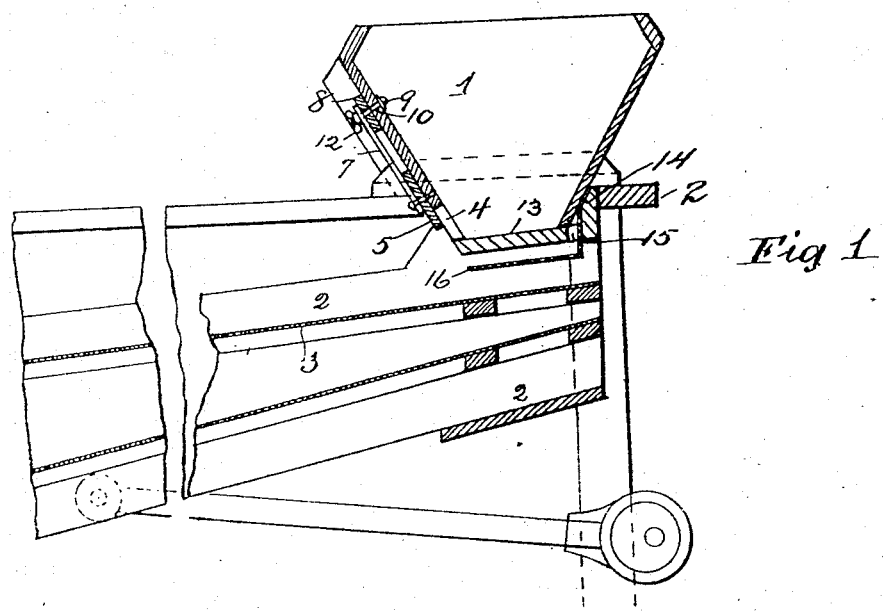
Figure 2:
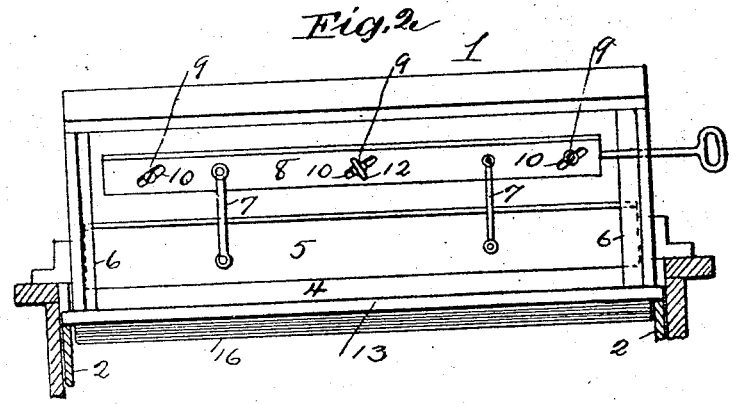

In the accompanying drawings, Figure 1 is a vertical central section through the hopper of a seed-cleaning device. Fig. 2 is a front view thereof.

In the views, 1 is the hopper; 2, the shoe; 3, one of the inclined screens.

4 is the opening in the front wall of the hopper. 5 is the slide therefor, movable in guides 6 at either end. 7 7 are links connecting this slide with the bar 8, which is capable of both vertical and longitudinal movements by means of pins 9, fixed in the solid face of the hopper, and parallel inclined slots 10 in the bar 8, through which the pins pass. By seizing this bar by hand and giving it longitudinal movement the slide or door below can be made to open or close as desired.

A thumb-nut 12 may be screwed upon the threaded extremity of one of the pins and may serve to secure slide at any desired width of opening to control the flow of seed to the sieves.

13 is a stop or bottom plate which closes the bottom of the hopper and is attached to the side walls of the reciprocating shoe. This moves backward and forward with the shoe, and since the plate does not tightly engage the bottom of the hopper-walls it is extremely likely to carry the material lying upon it back of the hopper-wall, where it will lodge against the back wall 14, which is now in general use to prevent such matters from spilling over the upper end of the shoe. To prevent the lodging of such materials in a position between the hopper and the wall where they cannot be readily removed and where the gradual accumulation would prevent the free movement of the plate 13 and shoe, the outer edge of the plate is cut away or slotted at 15 next to the wall 14, so that such material if passed behind the wall of the hopper will fall through and not be retained upon the plate. The inclined bottom 13, the wall 14, and sheet-metal shelf 16 are all secured to the reciprocating hopper 2 and move therewith. To prevent such material from falling upon the upper edge of the screen below, a shelf 16 is attached to the rear wall 14 and inclines downward to throw the material farther down upon the screen, where it will mix with the other material falling from the hopper.

I am aware that in Letters Patent of the United States bearing No. 668,205 the inventor employs a bottom hopper-plate pivoted to tilt at varying angles to regulate the flow of matters from the hopper; but it has no part in the practicability and especial efficiency of this invention, since there is no opening between the edge of the plate and the back wall through which overflowing material can escape, but depends upon its pivotal support to provide sufficient inclination to permit all matters resting on said plate to flow off from it by gravity. In my device I do not alter the degree of inclination of the plate, but having a plate of fixed inclination which is the same as that of the guide in which the shoe reciprocates. I provide it with most efficient means for freeing itself from an accumulation in the angle with the rear wall.

Having described my invention, what I claim as new, and desire to secure by Letters Patent, is—

The combination with the hopper and the reciprocating shoe of a seed-cleaning machine, of a stop or bottom plate for the hopper having the same fixed inclination as the shoe and secured to the side walls of the said shoe, and a wall spaced from said stop-plate and secured in the side walls of said hopper at either end, whereby an opening is formed through which all material passing underneath the rear wall of the hopper will be permitted to fall therethrough inside the said rear wall and stop-plate, substantially as described.

In testimony whereof I hereunto set my hand this 18th day of July, 1904.

JONATHAN HARRIS.

Witnesses:
GEO. S. COLE,
WM. M. MONROE.